United States Patent [19]

Ensor

[11] 3,711,559

[45] Jan. 16, 1973

[54] MONOALKYLATION OF ALKYLIDENE BIS(PHENOL)

[75] Inventor: Gordon Roy Ensor, Llangollen, Wales

[73] Assignee: Monsanto Chemicals Limited, London, England

[22] Filed: Feb. 26, 1968

[21] Appl. No.: 707,968

[52] U.S. Cl. .................260/619 A, 260/619 D
[51] Int. Cl. .....C07c 37/14, C07c 37/16, C07c 37/18
[58] Field of Search..............260/619 A, 624, 619 D

[56] References Cited

UNITED STATES PATENTS

| | | | |
|---|---|---|---|
| 2,745,726 | 5/1956 | Young et al. | 260/619 A X |
| 2,655,546 | 10/1953 | Stevens et al. | 260/624 R |
| 1,977,627 | 10/1934 | Greenhalgh | 260/619 A |
| 1,978,949 | 10/1934 | Kohn et al. | 260/619 A |
| 2,302,363 | 11/1942 | Bellefontaine | 260/619 X |
| 2,745,726 | 5/1956 | Young et al. | 260/619 X |
| 2,831,898 | 4/1958 | Ecke et al. | 260/619 X |
| 2,841,623 | 7/1958 | Norton et al. | 260/619 X |

*Primary Examiner*—Bernard Helfin
*Assistant Examiner*—Norman Morgenstern
*Attorney*—Richard O. Zerbe and F. M. Murdock

[57] ABSTRACT

An alkylidene bis(phenol) which may be formed in situ, if desired, is reacted with an alkylating agent in a reaction medium of 50 to 80 percent aqueous sulfuric acid to give the monoalkylate as the major component.

13 Claims, No Drawings

MONOALKYLATION OF ALKYLIDENE BIS(PHENOL)

This invention relates to an alkylation process, and more particularly to a process for the production of alkylated bis(phenols).

Materials of this type are known to be effective in inhibiting the oxidation of organic materials, for example oils, plastics and rubber. The class of alkylated bis(phenols) includes members that are solids and others that are liquids under normal atmospheric conditions. While there is no general correlation between the effectiveness of an alkylated bis(phenol) as an antioxidant and its physical state at atmospheric temperature, the rubber industry often prefers to handle solid rather than liquid additives in the manufacture of its products.

The alkylated alkylidenebis(phenols) form an important group of alkylated bis(phenols), but the potentially cheapest route to these compounds, namely the direct alkylation of bis(phenols), has not hitherto been available for the manufacture of solid products, since under conventional conditions of alkylation, liquid mixtures of compounds alkylated to different degrees are obtained. We have now found that by the use of a certain reaction medium alkylidenebis(phenols) can be alkylated to give, from any one bis(phenol), a product consisting largely of the monoalkylated bis(phenol), which in many instances is a solid at ordinary temperatures.

The process of the invention is one for the production of an alkylated alkylidenebis(phenol), in which an alkylidenebis(phenol) having at least on unsubstituted position ortho or para to a phenolic hydroxyl group and free from tertiary alkyl groups in such ortho and para positions is reacted with an alkylating agent using aqueous sulphuric acid containing at least 50 percent by weight $H_2SO_4$ as the reaction medium to give the monoalkylated derivative of the alkylidenebis(phenol) as the major component of the product.

Subject to the above limitations, the phenol nuclei can be substituted or unsubstituted so that the process can, for example, be used to introduce a further alkyl group into a phenol nucleus in which an alkyl group is already present.

The process is particularly useful for the alkylation of 4,4'-alkylidenebis(phenols) having the general formula:

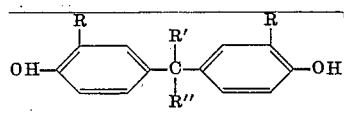

where R is a hydrogen atom or an alkyl group having from one to three carbon atoms, and R' and R'' are each an alkyl group having from one to three carbon atoms, for example 4,4'-isopropylidenebis(phenol) (Bisphenol A) and 4,4'-isopropylidenebis(2-methylphenol).

The optimum conditions of alkylation vary according to the particular alkylidenebis(phenol) to be alkylated. In the case of 4,4'-isopropylidenebis(phenol), for example, the acid concentration is preferably within the range 55 to 65 percent by weight, and the temperature at which the alkylation is conducted is preferably from 35° to 50°C. Most preferred are acid concentrations of from 58 to 62 percent by weight and temperatures of from 40°–45°C. Similar conditions can be used in the alkylation of 4,4'-isopropylidenebis(2-methylphenol).

The alkylating agent used in the process of the invention is preferably an olefin but it can alternatively be for example the corresponding alcohol or halide, i.e., an alcohol or halide which can give the olefin by dehydration or dehydrohalogenation respectively. The alkylating agent may have a straight, branched or cyclic chain, usually one containing from three to 12 carbon atoms.

Examples of suitable alkylating agents include propylene, isobutylene, 2-methylbutene-1, 2-methylbutene-2, cyclohexene, 1-methylcyclohexene, di-isobutene, styrene, propylene trimer and tetramer, isopropanol, t-butanol, t-amyl alcohol, cyclohexanol, 1 methylcyclohexanol, isopropyl chloride, t-butyl chloride, t-amyl chloride, monochlorocyclohexane, 1-methyl-2-chloro-cyclohexane, and the compounds formed by substituting bromine for chlorine where appropriate. The preferred alkylating agent is an isoolefin and in particular isobutylene.

Although the product obtained by the process of the invention is largely the monoalkylated derivative of the alkylidene-bis(phenol), to obtain good yields it is usually necessary to use more than 1 mole of alkylating agent per mole of alkylidenebis(phenol). The yield of mono-alkylated product is higher when for example 3 moles of alkylating agent are used than when 1.5 moles are used, but above 3 moles of alkylating agent per mole of alkylidenebis(phenol) the yield increase is less significant, and there is generally no advantage in using more than 3.5 moles of alkylating agent. In general, the preferred amount of alkylating agent is from 2.5 to 3.5 moles per mole of alkylidenebis(phenol). The quantity of the reaction medium relative to the quantity of alkylidenebis(phenol) to be alkylated is not critical, the minimum being determined by the requirements for a stirable mixture, while the use of larger than necessary amounts is avoided on economic grounds. The weight of the reaction medium may, for example, range from a quantity approximately equal to the weight of the alkylidenebis(phenol) to a quantity 10 times this weight, and in practice a quantity from 2 to 8 times, more particularly from 3 to 5 times the weight of the alkylidenebis(phenol) is usually preferred.

After the completion of the reaction of the alkylating agent with the bis(phenol), the solid product is separated from the reaction mixture and treated to remove traces of acid. This is conveniently done by washing the product first with water, then with saturated sodium bicarbonate solution and then again with water.

According to a further feature of the invention, an alkylidenebis(phenol) to be alkylated by the above-described process is itself formed by the condensation of a phenol with a ketone in a reaction medium which is an aqueous sulphuric acid containing at least the concentration of sulphuric acid required in the reaction medium for the alkylation process. The alkylidenebis(phenol) need not be isolated from the reaction medium in which it is formed; all that is required is that if necessary, the mixture should be diluted with water to give a sulphuric acid solution of appropriate strength for the alkylation reaction.

Alkylidenebis(phenols) that can be produced in this manner include those obtainable by the condensation of phenol, o-cresol, 2-ethylphenol, or 2n-propylphenol with ketones having the general formula:

$$R' - CO - R''$$

where R' and R'' have the same significance as in the formula of the alkylidenebis(phenols) above. Examples of such ketones are acetone and methyl ethyl ketone.

It is in general found that the optimum sulphuric acid concentration for the condensation reaction is higher than the optimum for the alkylation reaction. The former is usually in the range 70 – 75 percent by weight sulphuric acid. The lower limit for this concentration is of course the same as the lower limit for the concentration of the aqueous sulphuric acid reaction medium in the alkylation process (allowing for the water formed in the condensation process), while the upper useful limit is normally about 80 percent.

In practice, condensation of the phenol and ketone is usually carried out at a temperature of from 30° – 50°C., the range 38° – 43°C. being preferred. It is usual to employ substantially equivalent quantities of the phenol and ketone, i.e., two molar proportions of the former to one of the latter. The condensation is preferably carried out in the presence of a catalytic quantity of an organic thio compound, for example thioglycollic acid or mercaptopropionic acid.

The invention is illustrated by the following examples.

EXAMPLE 1

The Example describes the alkylation of 4,4'-isopropylidenebis (phenol) using isobutylene as the alkylating agent.

A 250 cc. three-necked flask was equipped with a stirrer, a thermometer and a three way tap connected to vacuum and an isobutylene supply. The latter was measured by water displacement as in a conventional hydrogenation apparatus.

39 cc. of water were charged into the flask followed by 33 cc. of 98 percent sulphuric acid. 25.3 Grams of 4,4'-isopropylidenebis(phenol) were added to the sulphuric acid at a temperature not exceeding 30°C. The flask was evacuated using a water pump and then connected to the isobutylene supply. After warming the mixture of sulphuric acid and bis(phenol) to 45°C., isobutylene was supplied until a total of 8,800 cc. has been absorbed, a process which took between 3 and 4½ hours. The temperature was maintained at 45°C. throughout. The mixture was then stirred for 2 hours at 45°C., cooled, filtered and washed with 50 cc. of water, with two 50 cc. quantities of a saturated sodium bicarbonate solution and finally with 50 cc. of water. The product after drying at approximately 60°C. under vacuum was a free-flowing cream powder. In a number of experiments using the same quantities of starting materials, yields of from 29.7 to 33.1 grams were obtained. A typical product had a melting range of 134° – 154°C. and the following composition, determined by gas-liquid chromatography:

2-tert-butyl-4,4'-isopropylidenebis(phenol) 65 – 70%
2,2'-di-tert-butyl-4,4'-isopropylidenebis(phenol) 6 – 10%
2,6-di-tert-butyl-4,4'-isopropylidenebis(phenol) 2 – 4%
2,6,2'-tri-tert-butyl-4,4'-isobutylidenebis(phenol) 1 – 3%

There were also present small amounts of di- and tri-tert-butylphenol and unreacted 4,4'-isopropylidenebis(phenol).

EXAMPLE 2

This example describes the alkylation of 4,4'-isopropylidenebis (2-methylphenol) with isobutylene.

Using the apparatus described in Example 1, isobutylene was passed into a stirred suspension of 20 grams of 4,4'-isopropylidenebis (2-methylphenol) in 80 grams of 60 percent by weight sulphuric acid at a temperature of 45°C. until, after 1¾ hours, 3.75 liters had been absorbed. The procedure for isolating the product was essentially the same as that employed in Example 1. The alkylated 4,4'-isopropylidene-bis(2-methylphenol) was obtained as a buff-colored powder weighing 21.2 grams.

EXAMPLE 3

This example describes the production of a t-butylated 4,4'-isopropylidenebis(phenol) using phenol, acetone and isobutylene as starting materials.

A mixture of 20.9 grams of phenol, 8.1 cc. of acetone, 0.33 gram of 85 percent thioglycollic acid and 0.66 cc. of toluene was added at a uniform rate, with stirring, to 150 grams of 72.5 percent by weight sulphuric acid, over a period of 1 hour. The temperature was maintained at 40° – 42°C. during the addition and for the following 1½ hours. At this point a further 0.5 cc. of acetone was added, and the reaction mixture was then maintained at 40°C. for a further 1½ hours.

The reaction mixture was then diluted with 32 cc. of water, thus giving a sulphuric acid concentration of 60°C by weight. Addition of isobutylene and the isolation of the product was carried out in essentially the same way as described in Example 1. In several runs, yields varying from 29.4 to 32.9 grams were obtained. In physical characteristics and compositions, the product did not differ significantly from that obtained by the procedure described in Example 1.

What is claimed is:

1. A process in which an alkylidene bis(phenol) having at least one unsubstituted position ortho or para to a phenolic hydroxyl group and free from tertiary alkyl groups in such ortho and para positions the substituents in the hydroxy phenyl radicals, if any, being alkyl of one to three carbon atoms is heated at 35°–50°C with more than one mole but not more than about 3.5 moles per mole of said phenol of an alkylating agent selected from the group consisting of olefins, alcohols and alkyl halides of three to 12 carbon atoms which alcohol and halide can give the olefin by dehydration or by dehydrohalogenation, respectively, using aqueous sulfuric acid containing 50–80 percent by weight $H_2SO_4$ as the reaction medium in the quantity of about one to ten times the weight of said phenol to give the monoalkylated derivative of the alkylidene bis(phenol) as the major component of the product.

2. A process in which a 4,4'-alkylidene bis(phenol) of the formula

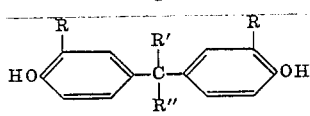

where each R is a hydrogen atom or an alkyl group having from one to three carbon atoms and R' and R" are each an alkyl group having from one to three carbon atoms is heated at alkylating temperature with more than one mole but not more than about 3.5 moles per mole of said phenol of an alcoholic or olefinic alkylating agent of three to 12 carbon atoms using aqueous sulfuric acid containing 50–80 percent by weight $H_2SO_4$ as the reaction medium in the quantity of about one to 10 times the weight of said phenol to give the monoalkylated derivative of the aforesaid 4,4'-alkylidene bis(phenol) as the major component of the product.

3. A process according to claim 2, in which the amount of alkylating agent used is from 2.5 moles to 3.5 moles per mole of alkylidene bis(phenol).

4. A process according to claim 2, in which the alkylating agent is an olefin containing from three to 12 carbon atoms per molecule.

5. A process according to claim 2, in which the olefin is isobutylene, 2-methylbutene-1, or 2-methylbutene-2.

6. A process according to claim 2, in which the phenol is 4,4'-isopropylidene bis(phenol), the aqueous sulfuric acid is 55–65 percent by weight, and the reaction temperature is 35°–50°C.

7. A process according to claim 6, in which the temperature is from 40° to 45°C. and the sulfuric acid concentration is from 58–62 percent by weight.

8. A process according to claim 6, in which the alkylating agent is an olefin having from three to 12 carbon atoms per molecule.

9. A process according to claim 8, in which the quantity of alkylating agent introduced into the reaction medium is about 2.5–3.5 moles per mole of 4,4'-isopropylidene bis(phenol).

10. A process according to claim 8, in which the weight of the reaction medium is from 3 to 5 times the weight of the 4,4'-isopropylidenebis(phenol).

11. A process according to claim 2, in which the 4,4'-alkylidene bis(phenol) is itself formed by charging to the reaction medium a phenol of the formula

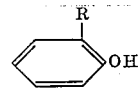

and a ketone of the formula

, R, R', and R" having the same meaning as before.

12. A process according to claim 11, in which R is hydrogen and R' and R" are methyl.

13. A process according to claim 12, in which the concentration of sulfuric acid is 70–80 percent by weight.

* * * * *